United States Patent
Hotta et al.

(10) Patent No.: US 12,528,508 B2
(45) Date of Patent: Jan. 20, 2026

(54) VEHICLE CONTROL SYSTEM

(71) Applicant: TOYOTA JIDOSHA KABUSHIKI KAISHA, Toyota (JP)

(72) Inventors: Daichi Hotta, Meguro-ku Tokyo-to (JP); Yusuke Hayashi, Atsugi (JP); Sadayuki Abe, Sunto-gun Shizuoka-ken (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 18/522,691

(22) Filed: Nov. 29, 2023

(65) Prior Publication Data

US 2024/0208538 A1    Jun. 27, 2024

(30) Foreign Application Priority Data

Dec. 27, 2022    (JP) .................................. 2022-209524

(51) Int. Cl.
| | | |
|---|---|---|
| *B60W 30/09* | (2012.01) | |
| *B60W 30/14* | (2006.01) | |
| *B60W 50/08* | (2020.01) | |
| *B60W 60/00* | (2020.01) | |

(52) U.S. Cl.
CPC ...... *B60W 60/0015* (2020.02); *B60W 30/143* (2013.01); *B60W 50/085* (2013.01); *B60W 60/0027* (2020.02); *B60W 2540/215* (2020.02); *B60W 2720/106* (2013.01)

(58) Field of Classification Search
CPC .......... B60W 60/0015; B60W 30/143; B60W 50/085; B60W 60/0027; B60W 2540/215; B60W 2720/106; B60W 30/0956; B60W 50/14; B60W 30/09
See application file for complete search history.

(56) References Cited

U.S. PATENT DOCUMENTS

| | | | | |
|---|---|---|---|---|
| 2020/0406932 | A1* | 12/2020 | Yamanouchi | .......... B60K 35/10 |
| 2021/0146917 | A1* | 5/2021 | Nagashima | ........... B60W 50/14 |
| 2021/0284141 | A1* | 9/2021 | Sugaya | .................. B60W 30/09 |
| 2022/0281443 | A1* | 9/2022 | Sung | ..................... B60W 40/08 |

FOREIGN PATENT DOCUMENTS

| | | |
|---|---|---|
| JP | 2006-256494 A | 9/2006 |
| JP | 2021-008160 A | 1/2021 |
| WO | 2019/087380 A1 | 5/2019 |

* cited by examiner

*Primary Examiner* — Masud Ahmed
(74) *Attorney, Agent, or Firm* — Dinsmore & Shohl LLP (57) ABSTRACT

A vehicle control system includes one or more processors configured to execute automated driving control that controls automated driving of a vehicle. The automated driving control includes risk avoidance control that avoids a collision with a target around the vehicle. When a notification representing a risk level around the vehicle is received from an operator during the automated driving control, the one or more processors are configured to relax an activation condition of the risk avoidance control or increase a control amount in the risk avoidance control as the risk level becomes higher.

7 Claims, 6 Drawing Sheets

10: VEHICLE CONTROL SYSTEM

VEHICLE CONTROL SYSTEM

CROSS-REFERENCES TO RELATED APPLICATION

The present disclosure claims priority to Japanese Patent Application No. 2022-209524, filed on Dec. 27, 2022, the contents of which application are incorporated herein by reference in their entirety.

TECHNICAL FIELD

The present disclosure relates to an automated driving technique for a vehicle.

BACKGROUND ART

Patent Literature 1 discloses an automated driving vehicle. The automated driving vehicle is provided with a touch panel for an operator to operate. When the operator presses a speed change button during the automated driving, the automated driving vehicle changes a speed accordingly and continues the automated driving.

LIST OF RELATED ART

Patent Literature 1: Japanese Laid-Open Patent Application No. JP-2021-008160

SUMMARY

According to the technique described in Patent Literature 1, the speed of the vehicle is changed according to the operator's operation during the automated driving of the vehicle. However, just doing so may not enough for appropriately securing a safety margin between the vehicle and an obstacle around the vehicle.

An object of the present disclosure is to provide a technique capable of appropriately avoiding a risk while taking an operator's sense into consideration during automated driving of a vehicle.

A first aspect is directed to a vehicle control system.

The vehicle control system includes one or more processors configured to execute automated driving control that controls automated driving of a vehicle.

The automated driving control includes risk avoidance control that avoids a collision with a target around the vehicle.

When a notification representing a risk level around the vehicle is received from an operator during the automated driving control, the one or more processors are configured to relax an activation condition of the risk avoidance control or increase a control amount in the risk avoidance control as the risk level increases.

A second aspect further includes the following feature in addition to the first aspect.

The automated driving control includes:
calculating a probability density distribution of a future position of the target by predicting a motion of the target around the vehicle;
determining a possibility of collision between the vehicle and the target based on the probability density distribution; and
activating the risk avoidance control according to the possibility of collision.

The one or more processors are further configured to increase a variance of the probability density distribution as the risk level increases, thereby relaxing the activation condition of the risk avoidance control or increasing the control amount in the risk avoidance control.

A third aspect further includes the following feature in addition to the first aspect.

The automated driving control includes generating a target path of the vehicle and controlling the vehicle to follow the target path.

The one or more processors are further configured to generate the target path in the risk avoidance control such that a lateral distance to the target increases as the risk level increases, thereby increasing the control amount in the risk avoidance control.

A fourth aspect further includes the following feature in addition to any one of the first to third aspects.

The one or more processors are further configured to:
generate a deceleration plan in which a deceleration increases as the risk level increases;
compare a risk avoidance speed plan, which is a speed plan for the risk avoidance control, with the deceleration plan to select one of the risk avoidance speed plan and the deceleration plan, whichever is lower in a speed of the vehicle; and
control the speed of the vehicle in accordance with the selected one.

A fifth aspect further includes the following feature in addition to any one of the first to third aspects.

The one or more processors are further configured to:
receive, as the notification representing the risk level, a number of pressing or a pressing time of a button that is pressed by the operator; and
set the risk level to be higher as the number of pressing or the pressing time of the button increases.

According to the present disclosure, the notification representing the risk level around the vehicle can be input by the operator during the automated driving control. In this case, as the risk level becomes higher, the risk avoidance control becomes more likely to operate or the control amount in the risk avoidance control increases. It is thus possible to appropriately avoid the risk while taking the operator's sense into consideration as well.

DETAILED DESCRIPTION

Embodiments of the present disclosure will be described with reference to the accompanying drawings.

1. Vehicle Control System

Figure 1:
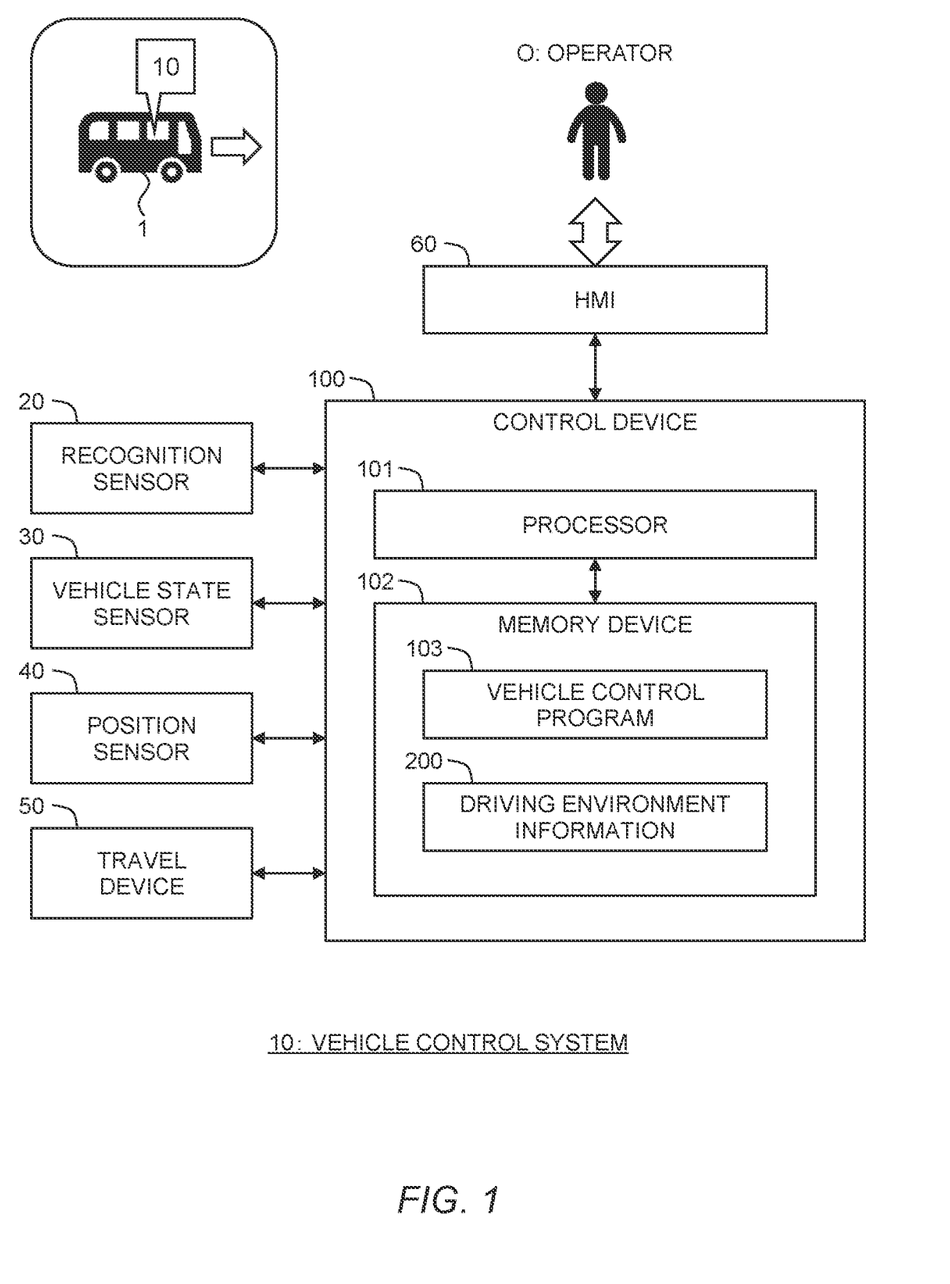
FIG. 1 is a block diagram illustrating a configuration example of a vehicle control system according to an embodiment.

FIG. 1 is a conceptual diagram for explaining an overview of a vehicle control system 10 according to the present embodiment. The vehicle control system 10 controls a vehicle 1. Typically, the vehicle control system 10 is installed on the vehicle 1. Alternatively, at least a part of the vehicle control system 10 may be disposed in an external device to remotely control the vehicle 1.

The vehicle control system 10 includes a sensor group mounted on the vehicle 1. The sensor group includes a recognition sensor 20, a vehicle state sensor 30, and a position sensor 40. The recognition sensor 20 recognizes (detects) a situation around the vehicle 1. Examples of the recognition sensor 20 include a camera, a laser imaging detection and ranging (LIDAR), a radar, and the like. The vehicle state sensor 30 detects a state of the vehicle 1. For example, the vehicle state sensor 30 includes a speed sensor, an acceleration sensor, a yaw rate sensor, a steering angle sensor, and the like. The position sensor 40 detects a position and a direction of the vehicle 1. For example, the position sensor 40 includes a global navigation satellite system (GNSS).

The vehicle control system 10 includes a travel device 50. The travel device 50 includes a steering device, a driving device, and a braking device. The steering device steers wheels. For example, the steering device includes an electric power steering (EPS) device. The driving device is a power source that generates a driving force. Examples of the driving device include an engine, an electric motor, and an in-wheel motor. The braking device generates a braking force.

The vehicle control system 10 includes a human machine interface (HMI) 60. The HMI 60 is an interface for receiving an input from an operator O of the vehicle 1 and presenting a variety of information to the vehicle 1. Typically, the operator O is on board the vehicle 1. As another example, the operator O may be a remote operator who performs remote support (remote monitoring, remote assistance, remote driving) of the vehicle 1. The HMI 60 includes an input device and an output device. Examples of the input device include a touch panel, a button, a keyboard, and the like. Examples of the output device include a touch panel, a display, a speaker, and the like.

The vehicle control system 10 further includes a control device (controller) 100. The control device 100 is a computer that controls the vehicle 1. The control device 100 includes one or more processors 101 (hereinafter, simply referred to as a processor 101) and one or more memory devices 102 (hereinafter, simply referred to as a memory device 102). The processor 101 executes a variety of processing. For example, the processor 101 includes a central processing unit (CPU). The memory device 102 stores a variety of information. Examples of the memory device 102 include a volatile memory, a nonvolatile memory, a hard disk drive (HDD), a solid state drive (SSD), and the like.

A vehicle control program 103 is a computer program for controlling the vehicle 1. The functions of the control device 100 may be realized by the processor 101 executing the vehicle control program 103. The vehicle control program 103 is stored in the memory device 102. Alternatively, the vehicle control program 103 may be recorded on a non-transitory computer-readable recording medium.

The control device 100 acquires driving environment information 200 indicating a driving environment for the vehicle 1. The driving environment information 200 is stored in the memory device 102. The driving environment information 200 includes map information, surrounding situation information, vehicle state information, vehicle position information, and the like.

The map information includes a general navigation map. The map information may indicate a lane configuration and a road shape.

The surrounding situation information, which is obtained based on the recognition sensor 20, indicates a situation around the vehicle 1. For example, the surrounding situation information includes an image captured by a camera. As another example, the surrounding situation information may include point cloud information obtained by LIDAR. Further, the surrounding situation information includes target information related to a target (object) around the vehicle 1. Examples of the target (object) around the vehicle 1 include a pedestrian, another vehicle, an obstacle, and the like. The target information indicates a relative position and a relative speed of the target with respect to the vehicle 1. For example, analyzing the image captured by the camera makes it possible to identify a target and to calculate the relative position of the target. It is also possible to identify a target based on the point group information obtained by the LIDAR and acquire the relative position and the relative speed of the target.

The vehicle state information, which is detected by the vehicle state sensor 30, indicates a travel state of the vehicle 1. Examples of the travel state of the vehicle 1 include a vehicle speed (velocity), a steering angle, an acceleration, a yaw rate, and the like.

The vehicle position information, which is detected by the position sensor 40, indicates the position of the vehicle 1. Furthermore, the control device 100 may acquire highly accurate vehicle position information by a known self-position estimation process (localization) using the map information and the target information.

Moreover, the control device 100 executes vehicle travel control for controlling travel of the vehicle 1. The vehicle travel control includes steering control, acceleration control, and deceleration control. The control device 100 executes the vehicle travel control by controlling the travel device 50 (i.e., the steering device, the driving device, the braking device).

Furthermore, the control device 100 performs automated driving control for controlling automated driving of the vehicle 1. Here, the automated driving means that steering, acceleration, and deceleration of the vehicle 1 are automatically performed independently of the driver's operation. For example, the automated driving supposed here is one where a driver may not necessarily 100% concentrate on the driving (e.g., so-called Level 3 or higher level automated driving). The control device 100 generates a travel plan of the vehicle 1 based on the driving environment information 200. Examples of the travel plan include keeping a current travel lane, making a lane change, making a right or left turn, avoiding an obstacle, and the like. Furthermore, the control device 100 generates a target trajectory necessary for the vehicle 1 to travel in accordance with the travel plan based on the driving environment information 200. The target trajectory includes a target position and a target velocity. Then, the control device 100 performs the vehicle travel control such that the vehicle 1 follows the target trajectory. More specifically, the control device 100 calculates a control amount necessary for the vehicle 1 to follow the target trajectory TR. Then, the vehicle travel control unit 150 controls the travel device 50 in accordance with the control amount.

2. Risk Avoidance Control

Figure 2:
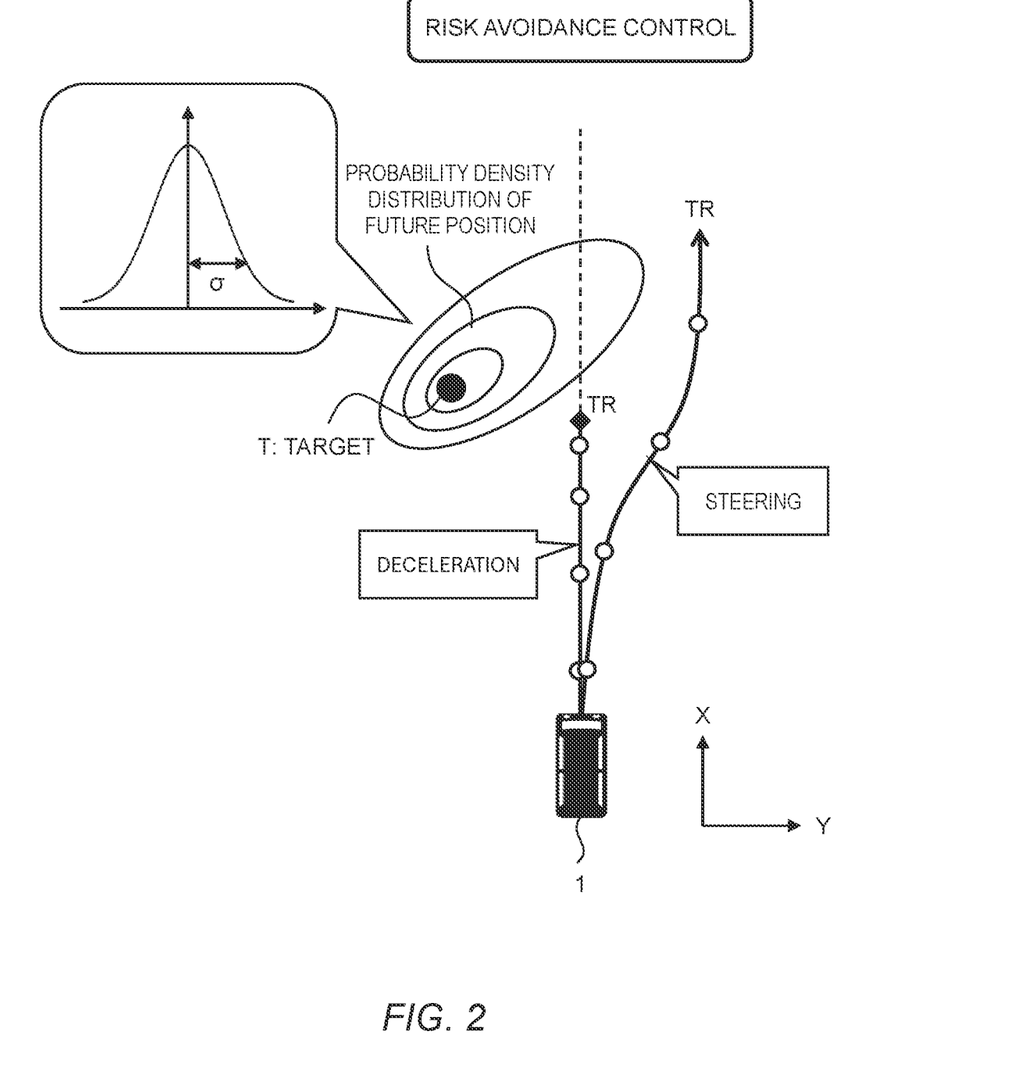
FIG. 2 is a conceptual diagram for explaining risk avoidance control according to an embodiment.

FIG. 2 is a conceptual diagram for explaining "risk avoidance control" according to the present embodiment. The risk avoidance control is control for avoiding a collision with a target T around the vehicle 1, and is included in the automated driving control. Examples of the target T around the vehicle 1 include a pedestrian, another vehicle, and the like. The control device 100 performs at least one of steering and deceleration in order to avoid the collision with the target T. More specifically, the control device 100 generates a target trajectory TR for avoiding the collision with the target T, that is, a target trajectory TR for the risk avoidance control. The target trajectory TR includes a target position and a target velocity. Then, the control device 100 performs the vehicle travel control such that the vehicle 1 follows the target trajectory TR.

Figure 3:
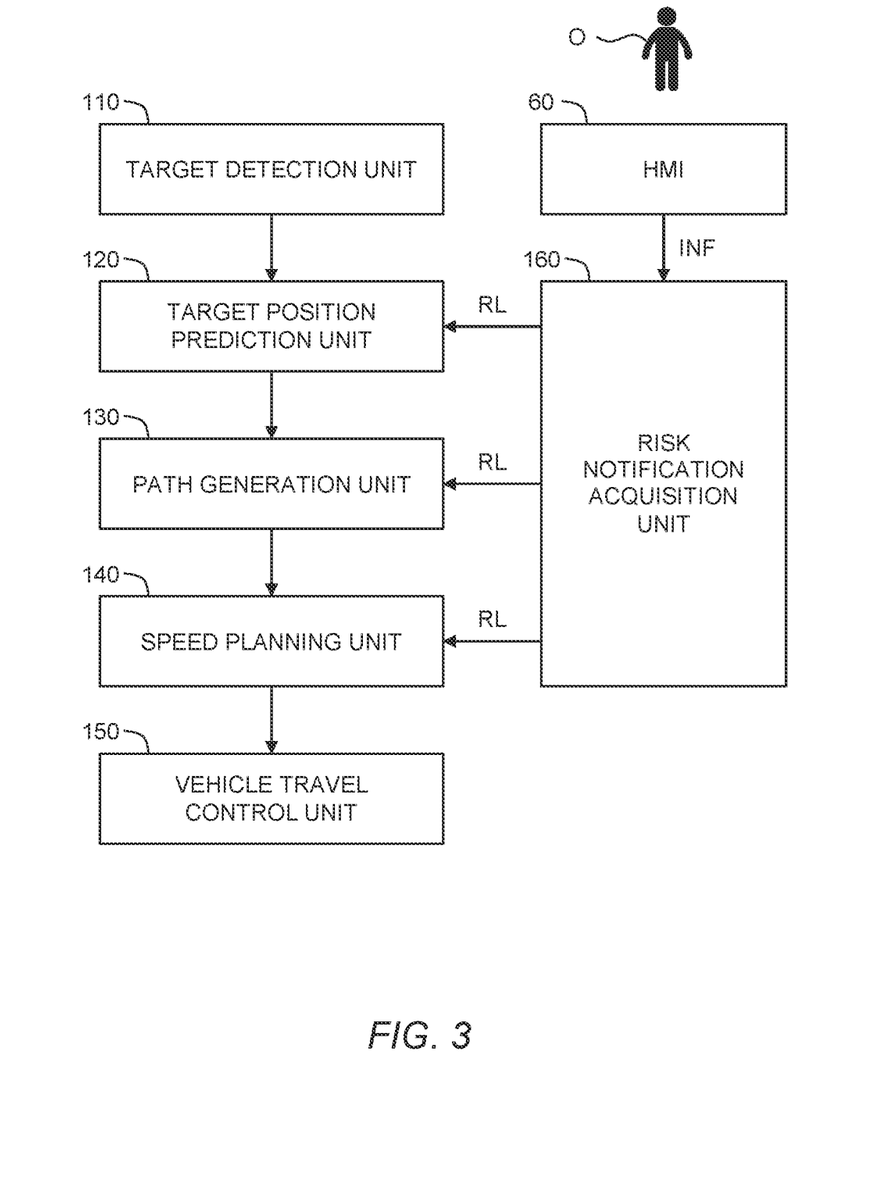
FIG. 3 is a block diagram showing an example of a functional configuration related to the risk avoidance control according to an embodiment.

FIG. 3 is a block diagram illustrating an example of a functional configuration related to the risk avoidance control. The control device 100 includes, as functional blocks, a target detection unit 110, a target position prediction unit 120, a path generation unit 130, a speed planning unit 140, a vehicle travel control unit 150, and a risk notification acquisition unit 160. These functional blocks are realized by, for example, a cooperation between the processor 101 executing the vehicle control program 103 and the memory device 102.

The target detection unit 110 detects a target T around the vehicle 1 based on the recognition sensor 20 and acquires the target information described above. The target information indicates the relative position and the relative speed of the target T with respect to the vehicle 1.

The target position prediction unit 120 predicts a motion (behavior) of the target T detected by the target detection unit 110. A known motion prediction model is utilized for predicting the motion of the target T. The target position prediction unit 120 calculates a future position of the target T by predicting the motion of the target T. As shown in FIG. 2, the future position of the target T is given as a probability density distribution.

The path generation unit 130 determines a possibility of collision between the vehicle 1 and the target T. More specifically, the path generation unit 130 calculates a predicted trajectory of the vehicle 1 based on the current position and the velocity of the vehicle 1. The current position and the velocity of the vehicle 1 are obtained from the vehicle position information and the vehicle state information, respectively. Further, the path generation unit 130 determines the possibility of collision (degree of interference) between the vehicle 1 and the target T based on the predicted trajectory of the vehicle 1 and the probability density distribution of the future position of the target T. When the possibility of collision exceeds a threshold value, the path generation unit 130 determines that the risk avoidance control is necessary. When it is determined that the risk avoidance control is necessary, the path generation unit 130 determines a target path for the risk avoidance control in consideration of the possibility of collision. For example, the path generation unit 130 generates a plurality of target path candidates and then selects one of the plurality of target path candidates as a target path in consideration of the possibility of collision.

The speed planning unit 140 determines a speed plan necessary for avoiding the collision between the vehicle 1 and the target T based on the possibility of collision (the degree of interference) and the target path. For example, the speed planning unit 140 sets a deceleration to be higher as the possibility of collision becomes higher.

A combination of the target path and the speed plan thus determined corresponds to the target trajectory TR. The vehicle travel control unit 150 performs the vehicle travel control such that the vehicle 1 follows the target trajectory TR.

3. Automated Driving Control in Consideration of Risk Notification From Operator

3-1. Overview

During the automated driving control, the operator O of the vehicle 1 may be aware of a risk around the vehicle 1, separately from the vehicle control system 10. For example, the operator O may notice earlier than the vehicle control system 10 that a preceding vehicle is decelerating. As another example, the operator O may predict that a target T may come out of a blind spot in front of the vehicle 1. That is, the risk perceived by the operator O may be a manifest risk or may be a potential risk. The operator O may perceive (recognize), predict, or vaguely feel a risk around the vehicle 1. Such the perception, prediction, feeling, opinion, and the like of the operator O with regard to the risk are collectively referred to as a "sense of the operator O regarding the risk".

If the sense of the operator O regarding the risk around the vehicle 1 can be notified (transmitted) to the vehicle control system 10, the vehicle control system 10 is able to execute the automated driving control in consideration of the sense of the operator O regarding the risk, which is useful. In view of the above, the vehicle control system 10 according to the present embodiment is configured to be able to receive information on the risk notified from the operator O. A component responsible for this is the risk notification acquisition unit 160 shown in FIG. 3.

The risk notification acquisition unit 160 receives a risk notification INF from the operator O via the HMI 60. The risk notification INF is information representing a risk level RL (a degree of risk) around the vehicle 1. The risk level RL is based on the sense of the operator O.

For example, the HMI 60 includes a button that is pressed by the operator O. The operator O who is aware of the risk during the automated driving control presses the button. When the operator O feels that the risk level RL is high, the operator O may press the button repeatedly or may press the button for a long time. That is, the risk level RL is proportional to the number of pressing or a pressing time of the button. When the button is not pressed by the operator O, there is no risk noticed by the operator O and the risk level RL is 0. The risk notification acquisition unit 160 receives, as the risk notification INF, information on the number of pressing or the pressing time of the button included in the HMI 60. Then, the risk notification acquisition unit 160 sets the risk level RL to be higher as the number of pressing or the pressing time of the button increases.

It should be noted that the risk notification INF does not include an explicit deceleration instruction or an explicit stop instruction by the operator O. The risk notification INF merely represents the risk level RL that is based on the sense of the operator O.

In this manner, the control device 100 receives the risk notification INF from the operator O and acquires the risk level RL represented by the risk notification INF. Even after receiving the risk notification INF from the operator O, the control device 100 continues the automated driving control without terminating the automated driving control. However, the control device 100 performs the automated driving control (in particular, the risk avoidance control) in consideration of the risk level RL that is based on the sense of the operator O. More specifically, as the risk level RL becomes higher, the control device 100 relaxes the activation condition of the risk avoidance control or increases a control amount in the risk avoidance control. Relaxing the activation condition of the risk avoidance control means making it easier to activate the risk avoidance control. Examples of the control amount in the risk avoidance control include a deceleration, a steering amount, and the like. As the control amount in the risk avoidance control increases, an avoidance action for the vehicle 1 to avoid the risk increases. Specific examples of the risk avoidance control in consideration of the risk level RL will be described later.

As described above, according to the present embodiment, the risk notification INF representing the risk level RL around the vehicle 1 can be input by the operator O during the automated driving control. In this case, as the risk level RL becomes higher, the risk avoidance control becomes more likely to operate, or the control amount in the risk avoidance control increases. It is thus possible to appropriately avoid the risk while taking the sense of the operator O into consideration as well.

As a comparative example, a case where the operator O gives an explicit deceleration instruction or an explicit stop instruction to the vehicle control system 10 will be considered. In this case, the vehicle control system 10 decelerates or stops the vehicle 1 in accordance with the instruction from the operator O. However, in this case, the operator O is not able to appropriately grasp or control a distance between the vehicle 1 and an obstacle. Therefore, in the case of the comparative example, there is a possibility that a safety margin between the vehicle 1 and the surrounding obstacle cannot be appropriately secured.

On the other hand, according to the present embodiment, the operator O notifies the vehicle control system 10 of the risk level RL that is based on the sense of the operator O. The vehicle control system 10 executes the risk avoidance control by its own decision while considering the risk level RL that is based on the sense of the operator O. Therefore, it is possible to appropriately secure the safety margin between the vehicle 1 and the surrounding obstacle.

Hereinafter, specific examples of risk avoidance control in consideration of the risk level RL will be described.

3-2. Target Position Prediction Process in Consideration of Risk Level

As shown in FIG. 3, the risk notification acquisition unit 160 notifies the target position prediction unit 120 of the risk level RL. The target position prediction unit 120 performs the target position prediction process in consideration of the risk level RL.

Figure 4:
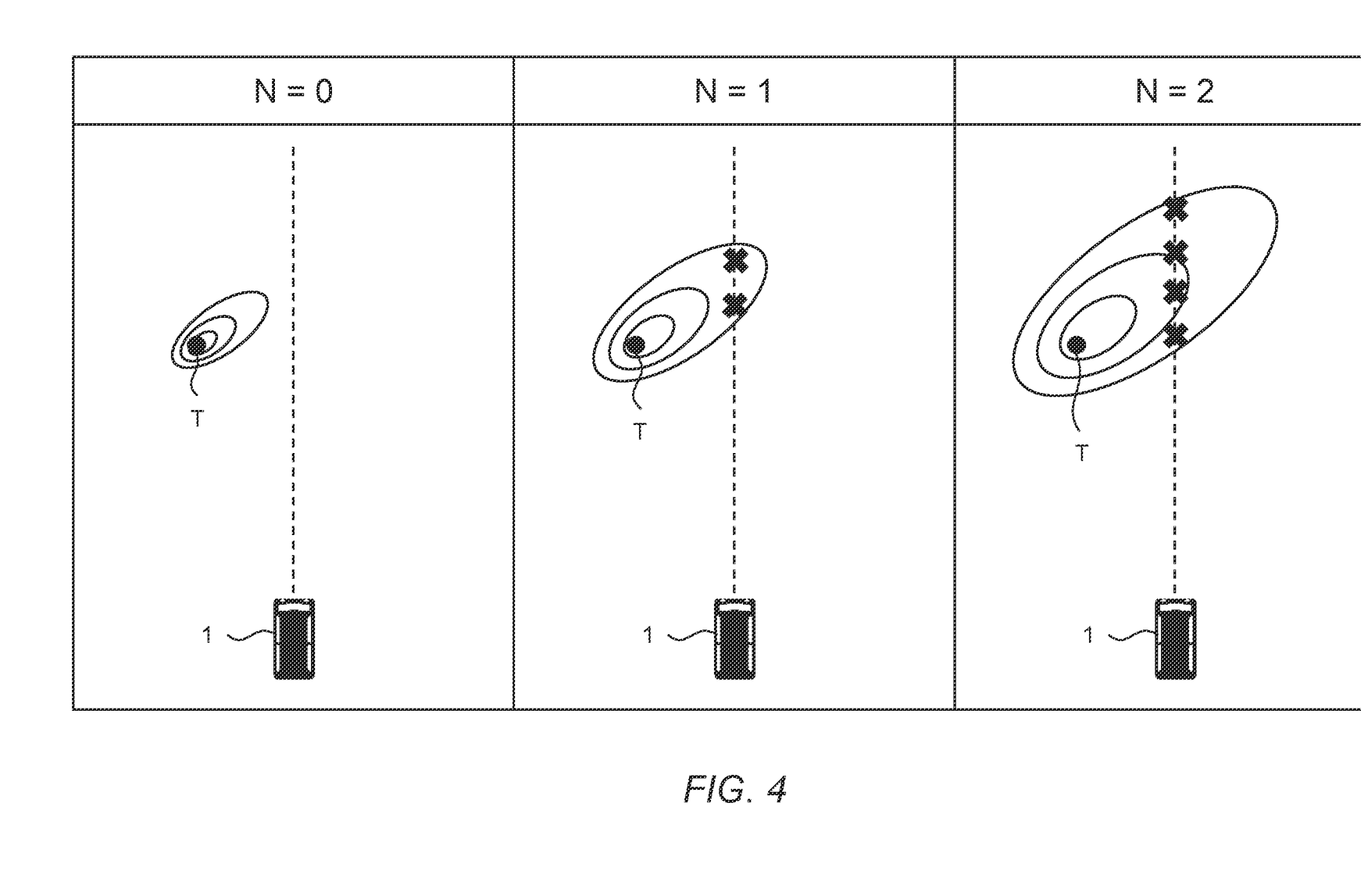
FIG. 4 is a conceptual diagram for explaining an example of a target position prediction process in consideration of the risk level according to an embodiment.

FIG. 4 is a conceptual diagram for explaining an example of the target position prediction process in consideration of the risk level RL. In this example, the risk level RL is represented by the number of pressing N of the button by the operator O. As described above, the target position prediction unit 120 calculates the probability density distribution of the future position of the target T by predicting the motion (behavior) of the target T. At this time, the target position prediction unit 120 increases a variance σ of the probability density distribution as the risk level RL becomes higher. In other words, the target position prediction unit 120 enlarges the probability density distribution as the risk level RL becomes higher.

For example, the motion prediction model used for predicting the motion of the target T includes constraint parameters such as an upper limit speed, an upper limit acceleration, and an upper limit yaw rate of the target T. The target position prediction unit 120 increases the constraint parameter as the risk level RL becomes higher, thereby increasing the variance σ of the probability density distribution. For example, in a case of N=0, the constraint parameter is set to a default value P0. In a case of N>1, the constraint parameter is set to N×coefficient α×default value P0.

As shown in FIG. 4, as the probability density distribution of the future position of the target T expands, the possibility of collision (the degree of interference) between the vehicle 1 and the target T increases. As a result, the risk avoidance control that is activated according to the possibility of collision is more likely to be activated. In addition, the control amount (for example, the deceleration or the steering amount) in the risk avoidance control that is calculated according to the possibility of collision increases.

3-3. Path Generation Process in Consideration of Risk Level

As shown in FIG. 3, the risk notification acquisition unit 160 notifies the path generation unit 130 of the risk level RL. The path generation unit 130 performs the path generation process in consideration of the risk level RL.

Figure 5:
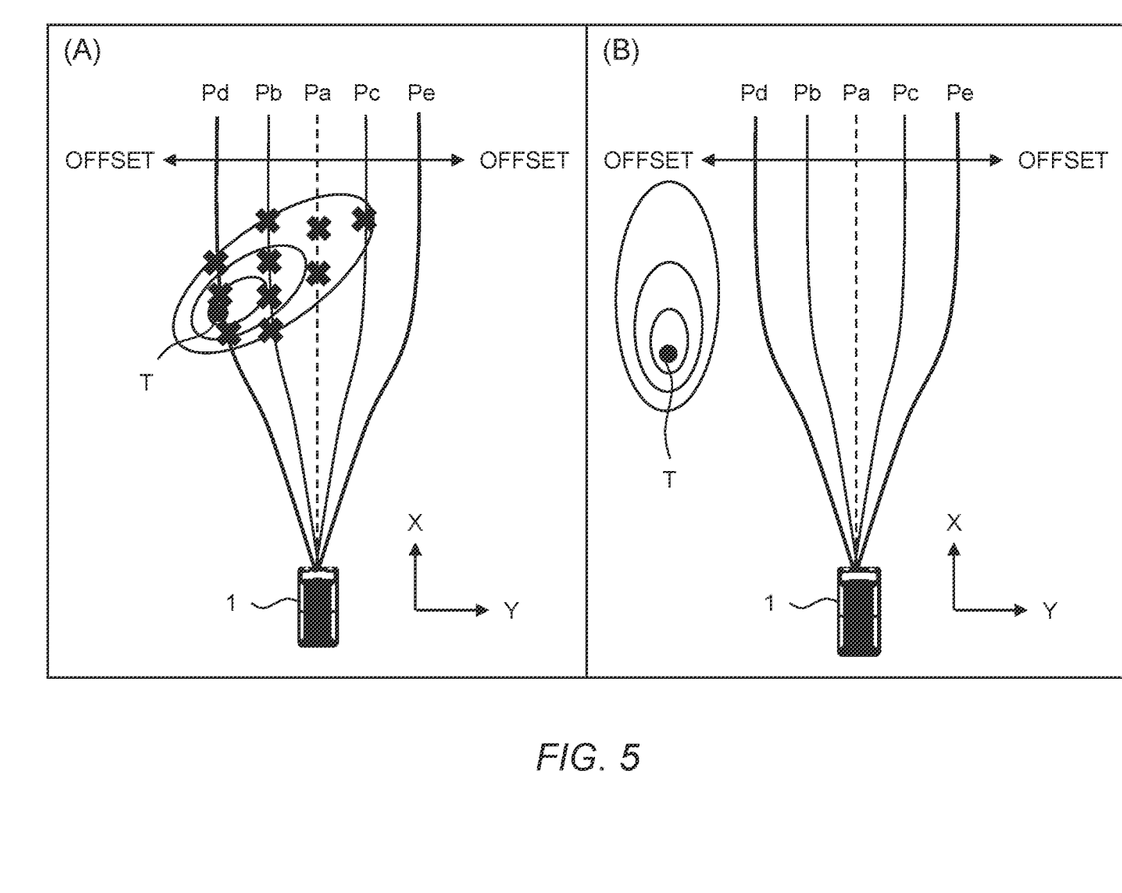
FIG. 5 is a conceptual diagram for explaining an example of a path generation process in consideration of the risk level according to an embodiment.

FIG. 5 is a conceptual diagram for explaining an example of the path generation process in consideration of the risk level RL. Also in this example, it is assumed that the risk level RL is represented by the number of pressing N of the button by the operator O. As described above, the path generation unit 130 generates the target path for the risk avoidance control. At this time, the path generation unit 130 generates the target path such that a lateral distance (i.e., Y-direction distance) to the target T increases as the risk level RL becomes higher.

In the example shown in FIG. 5, a path Pa is a base path. For example, the base path Pa is set to extend along a lane center. In a case of N=1, the path generation unit 130 sets the base path Pa as the target path. In a case of N=2, the path generation unit 130 generates path candidates Pb and Pc by shifting the base path Pa in the left and right directions, respectively. Further, the path generation unit 130 calculates the possibility of collision for each of the path candidates Pb and Pc based on the probability density distribution of the future position of the target T and each of the path candidates Pb and Pc. Then, the path generation unit 130 selects a path candidate having a lower possibility of collision as the target path (e.g., Pc in the example illustrated in the part (A) in FIG. 5). In a case of N=3, the path generation unit 130 generates path candidates Pd and Pe by shifting the base path Pa in the left and right directions, respectively. The shift amount in the case of N=3 is larger than the shift amount in the case of N=2. Then, the path generation unit 130 selects a path candidate having a lower possibility of collision as the target path (e.g., Pe in the example illustrated in the part (A) in FIG. 5). In this manner, the target path is generated such that the lateral distance to the target T increases as the risk level RL becomes higher.

A part (B) in FIG. 5 shows a case where the possibility of collision does not change even if the shift amount is changed. In this case, the base path Pa is set as the target path.

As described above, the target path is generated such that the lateral distance to the target T increases as the risk level RL becomes higher. Therefore, the control amount (i.e., the steering amount) required to follow the target path increases as the risk level RL becomes higher.

3-4. Speed Planning Process in Consideration of Risk Level

As shown in FIG. 3, the risk notification acquisition unit 160 notifies the speed planning unit 140 of the risk level RL. The speed planning unit 140 performs the speed planning process in consideration of the risk level RL.

Figure 6:
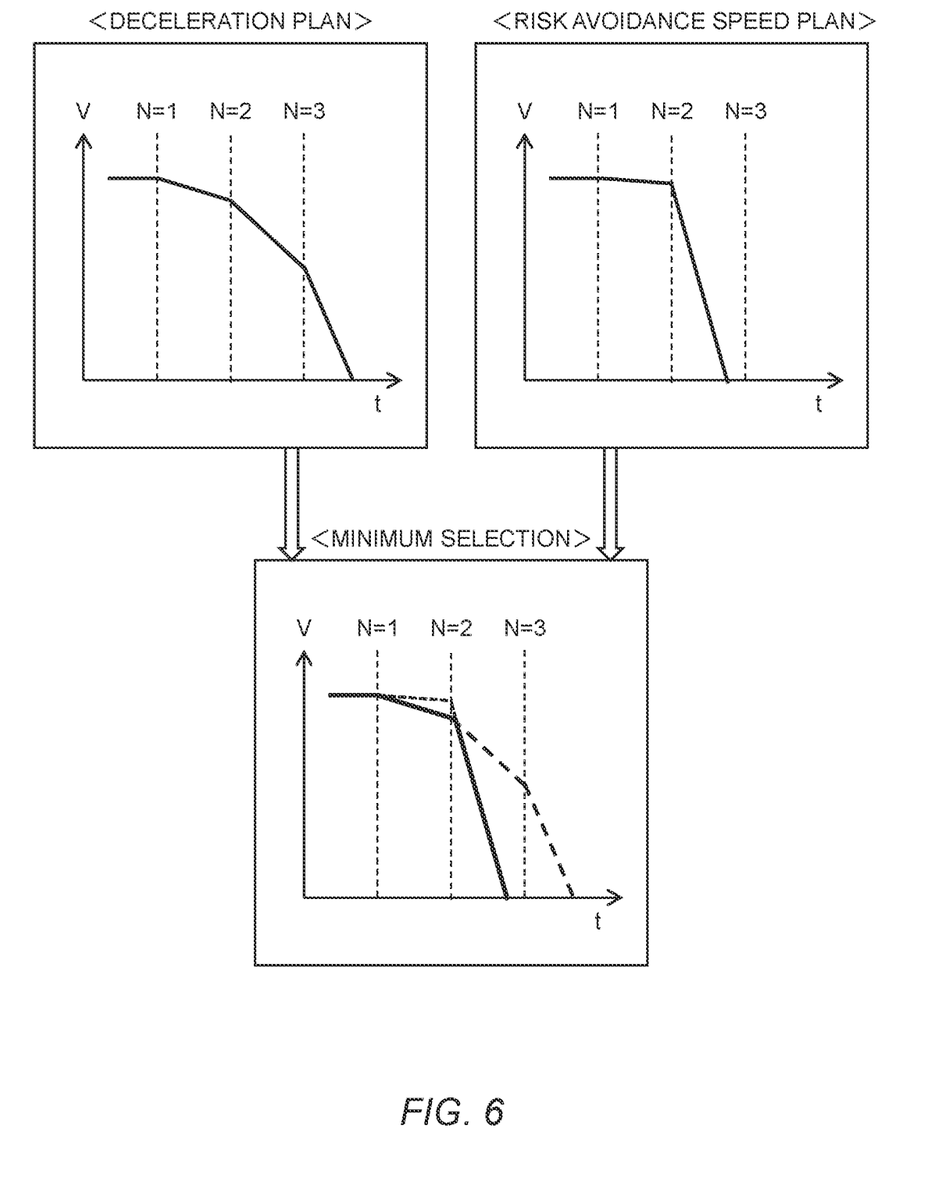
FIG. 6 is a conceptual diagram for explaining an example of a speed planning process in consideration of the risk level according to an embodiment.

FIG. 6 is a conceptual diagram for explaining an example of the speed planning process in consideration of the risk level RL. Also in this example, it is assumed that the risk level RL is represented by the number of pressing N of the button by the operator O. FIG. 6 shows a speed plan of the vehicle 1. A vertical axis represents the speed V of the vehicle 1, and a horizontal axis represents time. The speed planning unit 140 generates a "deceleration plan" in which a deceleration increases as the risk level RL becomes higher. When no target T is detected by the vehicle control system 10, the control device 100 performs the vehicle travel control in accordance with the deceleration plan. That is, the deceleration control is performed based on the sense of the operator O.

On the other hand, when the target T is detected by the vehicle control system 10, the above-described path generation unit 130 generates the target path for the risk avoidance control. The speed planning unit 140 determines a speed plan necessary for avoiding a collision between the vehicle 1 and the target T, based on the possibility of collision (the degree of interference) and the target path. Such the speed plan for the risk avoidance control is hereinafter referred to as a "risk avoidance speed plan." The speed planning unit 140 compares the risk avoidance speed plan with the above-described deceleration plan to select one of the risk avoidance speed plan and the deceleration plan, whichever is lower in the speed V of the vehicle 1. Then, the control device 100 performs the vehicle travel control in accordance with the selected one of the speed plans. In this way, the control amount (i.e., the deceleration) in the risk avoidance control increases as the risk level RL becomes higher.

3-5. Others

A combination of some of the processes described in the above Sections 3-2 to 3-4 is also possible. Alternatively, only one of the processes described in the above Sections 3-2 to 3-4 may be performed. That is, the risk notification acquisition unit 160 may notify at least one of the target position prediction unit 120, the path generation unit 130, and the speed planning unit 140 of the risk level RL. When at least one of the target position prediction unit 120, the path generation unit 130, and the speed planning unit 140 performs the processing in consideration of the risk level RL, at least an effect can be obtained.

4. Effects

As described above, according to the present embodiment, the risk notification INF representing the risk level RL around the vehicle 1 can be input by the operator O during the automated driving control. In this case, as the risk level RL becomes higher, the risk avoidance control becomes more likely to operate, or the control amount in the risk avoidance control increases. It is thus possible to appropriately avoid the risk while taking the sense of the operator O into consideration as well.

The technology according to the present embodiment may be applied to Lv2+ operation for development, verification, and evaluation of Lv4 automated driving. In the Lv2+ operation, the automated driving control is performed based on the the Lv4 automated driving system in a state where a safety monitoring operator is present in the vehicle 1. When the safety monitoring operator notices the risk earlier than the automated driving system, the safety monitoring operator may intervene in the automated driving. For example, when there is a delay in recognition or deceleration by the automated driving system, the safety monitoring operator may intervene in the automated driving at his/her discretion. However, if the safety monitoring operator intervenes each time even for a low-risk event, it is not possible to verify and evaluate whether or not the automated driving system is able to truly cope with the event. In such a case, when the safety monitoring operator inputs the risk notification INF, the automated driving system is able to carefully continue the automated driving control without terminating the automated driving control. It is thus possible to verify and evaluate the automated driving system. That is, a verification efficiency and an evaluation efficiency of the automated driving system are improved.

What is claimed is:

1. A vehicle control system comprising:
   one or more processors configured to execute automated driving control that controls automated driving of a vehicle, wherein
   the automated driving control includes risk avoidance control that avoids a collision with a target around the vehicle, and
   the one or more processors are further configured to:
      during execution of the automated driving control where an operator does not perform any driving operation of the vehicle, receive a risk notification representing a risk level around the vehicle from the operator through a human machine interface; and
      relax an activation condition of the risk avoidance control or increase a control amount in the risk avoidance control as the risk level represented by the risk notification becomes higher.

2. The vehicle control system according to claim 1, wherein
   the automated driving control includes:
      calculating a probability density distribution of a future position of the target by predicting a motion of the target around the vehicle;
      determining a possibility of collision between the vehicle and the target based on the probability density distribution; and
      activating the risk avoidance control according to the possibility of collision, and
   the one or more processors are further configured to increase a variance of the probability density distribution as the risk level becomes higher, thereby relaxing the activation condition of the risk avoidance control or increasing the control amount in the risk avoidance control.

3. The vehicle control system according to claim 1, wherein
   the automated driving control includes generating a target path of the vehicle and controlling the vehicle to follow the target path, and
   the one or more processors are further configured to generate the target path in the risk avoidance control such that a lateral distance to the target increases as the risk level becomes higher, thereby increasing the control amount in the risk avoidance control.

4. The vehicle control system according to claim 1, wherein
the one or more processors are further configured to:
generate a deceleration plan in which a deceleration increases as the risk level becomes higher;
compare a risk avoidance speed plan, which is a speed plan for the risk avoidance control, with the deceleration plan to select one of the risk avoidance speed plan and the deceleration plan, whichever is lower in a speed of the vehicle; and
control the speed of the vehicle in accordance with the selected one.

5. The vehicle control system according to claim 1, wherein
the one or more processors are further configured to:
receive, as the risk notification representing the risk level, a number of times that the operator presses a button on the human machine interface or a duration of time that the operator presses the button on the human machine interface; and
determine the risk level based on the number of times that the operator presses the button or the duration of time that the operator presses the button.

6. The vehicle control system according to claim 5, wherein the risk level is determined to be higher as the number of times that the operator presses the button or the duration of time that the operator presses the button increases.

7. The vehicle control system according to claim 1, wherein the risk notification does not include an explicit deceleration instruction or an explicit stop instruction.

* * * * *